M. J. WIGHTMAN.
ELECTRIC RAILROAD SWITCH.
APPLICATION FILED JAN. 2, 1908.
902,035.
Patented Oct. 27, 1908.
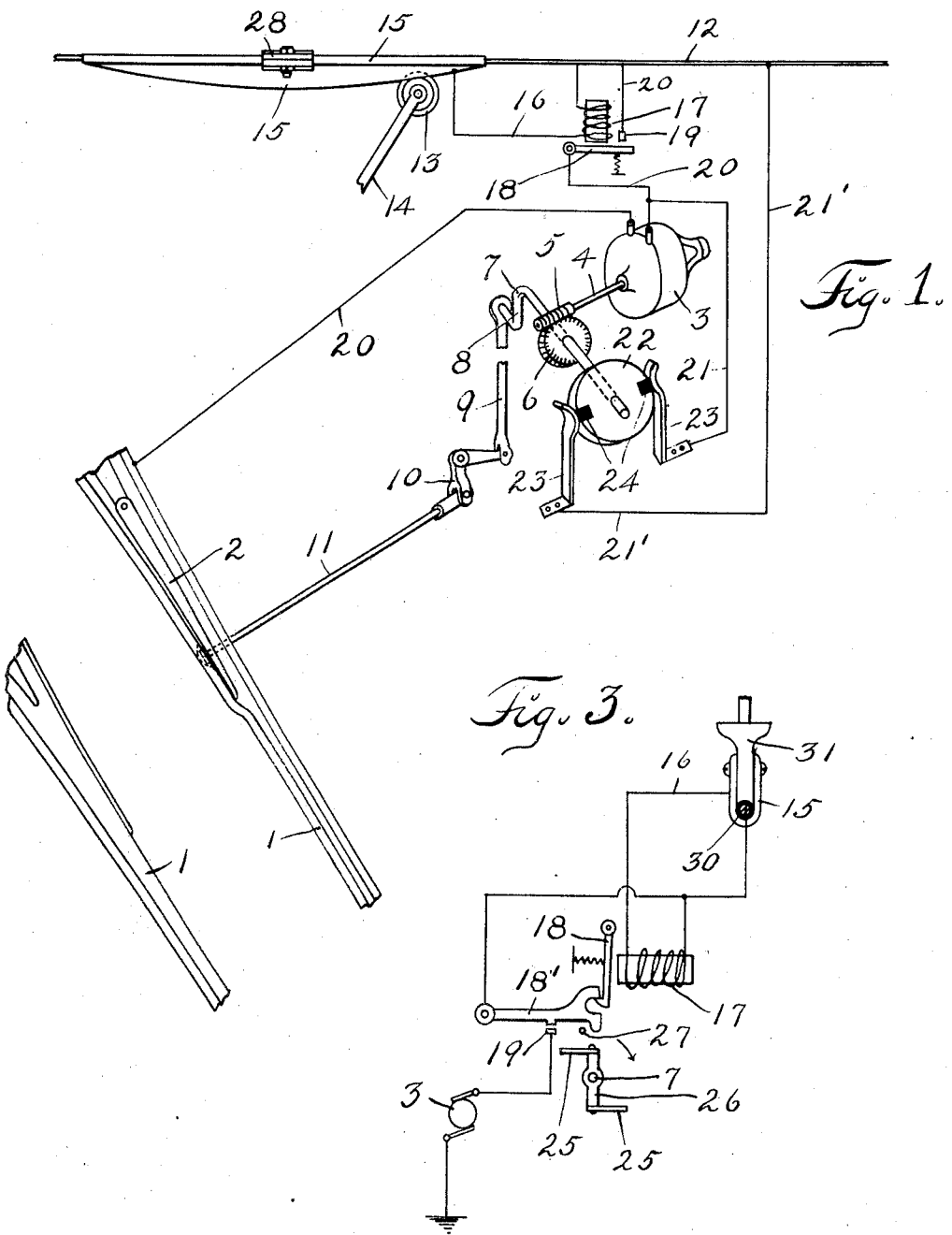
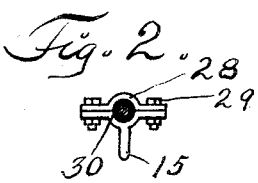
WITNESSES:
INVENTOR
Merle J. Wightman
BY
ATTORNEYS

UNITED STATES PATENT OFFICE.

MERLE J. WIGHTMAN, OF NEW YORK, N. Y.

ELECTRIC RAILROAD-SWITCH.

No. 902,035.  Specification of Letters Patent.  Patented Oct. 27, 1908.

Application filed January 2, 1908. Serial No. 409,074.

*To all whom it may concern:*

Be it known that I, MERLE J. WIGHTMAN, a citizen of the United States, and a resident of New York, in the county of New York and State of New York, have invented certain new and useful Improvements in Electric Railroad-Switches, of which the following is a specification.

My invention relates to means for operating railway switches and its object is to provide means whereby the position of the switch may be controlled from a vehicle moving over the line of rails.

The invention is especially suited for use with vehicles in which the motive power is electricity and may be employed alike in those systems wherein the moving vehicle takes its power from a trolley wire, a third rail or from a conductor in a slotted conduit.
The invention is, however, not confined to any special method of supplying current to the vehicle, nor to any special method of propelling the same.

By the use of my invention, a motorman on approaching a switch may, without leaving the vehicle, throw the switch to the desired position or may, at will, leave it in the position in which he finds it, if desired.

The principal parts of the apparatus employed in carrying out my invention comprise the usual railway switch that may be thrown to direct the moving vehicle to the desired line of track, an electric motor connected to the switch through mechanism by which it may reciprocate the same, suitable means whereby the vehicle as it approaches the switch may close an operating circuit of the motor, means for maintaining the operation of the motor independently of the position of the vehicle, and means operated by the motor or its connected mechanism and adapted to automatically stop the motor when the railway switch has completed its throw in one or the other direction.

In carrying out my invention, I prefer to bring the electric motor into operation by means of a circuit closer carried by the moving vehicle and adapted to engage an insulated section of conductor on the permanent way. Said circuit closer is by preference the collector by which current is supplied to the motor on the vehicle and the insulated section of conductor engaged by the same is properly connected to a supply circuit and magnetically operated switch, so that when the collector passes the insulated section and the circuit is closed at the controller on the vehicle, the magnetic switch will be operated and thereby bring the operating motor for the railway switch into action.

The novel combinations of apparatus and the special construction of devices constituting my invention will be described in connection with the accompanying drawings and then more particularly specified in the claims.

For the purpose of illustrating my invention, I have described the same as applied to a trolley system of electrical propulsion in which the vehicle takes its power from an overhead conductor.

Figure 1 of the drawings illustrates diagrammatically an arrangement of the apparatus embodying my invention, parts of the apparatus being shown in perspective. Fig. 2 is a vertical cross section through the trolley wire and devices for attaching an insulated section of conductor thereto. Fig. 3 is a diagrammatic view of a modified arrangement of circuits and switch devices for interrupting the circuit of the railway switch motor as soon as the switch has been thrown.

1 indicates the railway track and 2 the movable switch point at a branch or siding.
3 typifies an electric motor of any suitable construction connected through suitable mechanism with the switch point 2, so that when the motor operates, it will reciprocate the switch point and move it into either of the positions which it is required to assume. The reciprocating mechanism may be of various types. A preferred form of mechanism connecting the motor and switch point, is as follows:

4 is the motor shaft which, through a screw 5 and worm wheel 6 or other suitable reducing gear, rotates a shaft 7. Said shaft carries a crank arm 8, which is connected through a link 9 with an elbow or bell crank lever 10. The latter is joined by a link 11 to the switch point 2. Obviously, the rotation of shaft 7 produced by the motor 3 and the consequent turning of crank 8 will reciprocate the switch point 2, one whole revolution of the shaft 7 serving to move the switch point from open position of the switch to closed position and back again.

12 indicates the usual trolley wire and 13 the collector comprising, in the present instance, the usual underrunning trolley wheel borne by trolley 14.

15 is an insulated section of conductor adapted to be engaged by the collector 13 and joined by wire or connection 16 through an electromagnet 17 with any source of power, preferably, the source which supplies the motive current passing through the collector 13 to the vehicle.

Electromagnet 17 operates on a circuit closer of any desired kind whereby current may be supplied to motor 3 to start the same into operation. This circuit closer is typified by armature 18 for electromagnet 17 and a contact point 19 with which the armature 18 engages when the electromagnet is excited. A suitable retractor such, for instance, as a spring or gravity opens the circuit when the electromagnet 17 loses its power. Current is supplied to the motor 3 through the circuit closer from the trolley or feed wire to earth or other suitable return, the connections being indicated by numeral 20.

Section 15 of insulated conductor is a short section placed at some considerable distance in advance of the railway switch but sufficiently near thereto to permit the motorman to observe the position of the railway switch before the collector 13 will engage the insulated section 15.

Suitably connected with the electric motor 3 or the mechanism operated thereby is a circuit closer and breaker actuated by said motor and adapted to control an operating circuit of said motor in such manner that when the motor has operated to a sufficient extent to throw the switch 2 in one direction or the other, such operating circuit will be opened and the motor thereby be thrown out of action.

One of the forms of devices adapted to perform this function comprises a disk or wheel 22 of conducting material mounted on shaft 7 and engaged at diametrically opposite points by circuit closing brushes 23. In the face of said disk are non-conducting or insulating spaces 24 so located as to be engaged by the brushes 23 when the switch 2 has completed its throw. The brushes and disk control an operating circuit 21' of the motor which, as shown, is a substitute or branch circuit around the circuit closer 18. The circuit closer 18 momentarily closes the circuit of the motor and as soon as it begins to operate it completes the substitute circuit 21', so that the motor will continue to operate until the wheel 22 has made a half revolution, whereupon the circuit 21' will be opened and the circuit or connection through the device 18 having been already broken, as will be described, said motor will come to rest with the switch 2 in the desired position.

In Fig. 3, I illustrate a modification of my invention wherein I employ but one set of circuit closing contacts and one operating circuit or connection in place of the branch circuits shown in Fig. 1.

In the modification shown in Fig. 3, the magnet 17 releases the circuit closer which establishes the operating circuit for the motor 3 and retains its position until it is mechanically reset by mechanism driven from the motor, thereby breaking the circuit of the latter and bringing it to rest. In this instance, the armature 18 is shown as a trip armature adapted to trip or release the circuit closer 18' which then, by gravity or a spring, drops and engages the contact point 19 connected to the motor. When the motor has completed a throw of the railway switch, the mechanism driven by the motor lifts the circuit closer 18' and latches it upon the armature 18 thus opening the circuit and bringing the motor to rest. This resetting mechanism may consist of a pair of spring arms 25 projecting rearwardly from the ends of radial arms 26 which are carried by the motor driven shaft 7. These arms 25 normally occupy the position shown, but when revolved with the shaft 7 the one in advance first engages a suitably fixed pin 27 in its path and being first bent or deflected by engagement with said pin finally snaps by it and strikes a projection from the lever 18' and throws said lever back to position where it will catch upon the hook on armature lever 18.

In the case of a trolley wire 12, the insulated section of conductor 15 may be fastened thereto in the manner more clearly shown in Fig. 2 wherein the said section of conductor is shown provided with a pair of laterally extending flanges by means of which, and by a coöperating plate 28, said conductor may be clamped to the trolley wire.

29 indicates suitable clamp bolts and 30 indicates mica or other insulation separating the conductor and clamping devices from the trolley wire.

In Fig. 3 the insulated section of conductor 15 is of U-shape and its arms are bolted or fastened directly to the hanger 31 for the trolley wire 12, suitable insulation 30 being provided as before.

The operation of the apparatus is as follows: Let it be supposed that the switch 2 is open and that the motorman on approaching the switch and seeing that it is open desires to set and close said switch 2. As the collector 13 passes the insulated section 15, the motorman maintains the circuit through his controller, preferably on the first notch, so that as the collector passes momentarily over the section 15, the magnet 17 will be energized. Armature 18 thereupon closes the circuit of the motor 3 and the latter begins instantly to operate. As soon as it begins to operate, the circuit closing disk 22 moves from position shown and the springs 23 thereupon are electrically connected so as to complete the branch connection 21' for continuing the operation of the motor 3 after the collector 13 has left the conductor 15. Obviously the length of conductor 15 should be sufficient to permit the motor 3 to operate sufficiently long to close the connection between brushes 23. As the vehicle moves along the motor 3 continues to operate and quickly throws the switch 2. As will be understood, the position of the conductor 15 is sufficiently far in advance of the switch to permit the operation to be completed before the car wheels reach the switch. As soon as the switch is thrown, the motor 3 breaks its own circuit because it will have moved the wheel 22 through a half turn back to the position shown where the springs 23 will be opposite the insulating spaces.

The operation in the case of the arrangement shown in Fig. 3 is substantially the same. The closure of circuit on insulated section of conductor 15 energizes magnet 17 and the latter trips the circuit closer 18' which thereupon closes the motor connection to motor 3. The circuit closer 18' remains down and in position against a suitable stop which may be the pin 27, and the motor now continues to operate although the connection, through magnet 17, may have been broken by the collector leaving the insulated section of conductor. As soon as the switch has been thrown, the resetting devices will have been moved by the motor, so as to throw the lever 18' back into the position indicated, the motor thereby acting to break its own circuit and to be automatically thrown out of operation. Should the motorman on approaching the switch 2 see that the same is in the desired position, he simply throws his controller to open position or otherwise breaks the connection on the vehicle from collector 13, so that on passing the section of conductor 15, no effect will be produced upon magnet 17 and the motor 3 will remain at rest. As soon as the collector 13 passes section 15, the motorman may again apply the power without affecting the motor 3.

What I claim as my invention is:

1. The combination of a railway switch, a motor, mechanism driven thereby for reciprocating the switch, means for closing the circuit of the motor from a moving vehicle, means for maintaining a circuit of said motor independently of the position of the vehicle, and means for automatically stopping the motor when the railway switch completes its throw in one or the other direction.

2. The combination of a railway switch, an operating electric motor for reciprocating the same, an insulated section of conductor, a collector carried by the vehicle, a starting switch having a magnet energized over the circuit of said insulated section for starting the motor, and means driven by the motor for automatically closing an operating circuit of the motor as soon as it is started and breaking said circuit when the switch has completed its throw in one or the other direction.

3. The combination of a railway switch, an operating electric motor, a motor driven crank shaft and connecting mechanism between said crank and switch, a circuit closer and breaker in an operating circuit of the motor, means for causing the same to close said operating circuit when the motor starts and to break said circuit when the crank shaft has turned to a predetermined point, and independent means for starting the motor.

4. The combination of a railway switch, a current collector carried by a vehicle, an insulated section of conductor adapted to be engaged thereby, an electromagnet in a connection to said insulated section, an electric motor connected to the switch, a circuit closer controlling an operating circuit of the motor and operated by said magnet, a branch or substitute connection for supplying operating current to the motor, independent means for closing said circuit when the motor starts, and means for breaking said circuit automatically when the switch completes its throw.

5. The combination of a railway switch, a current collector on a vehicle, an insulated section of conductor engaged thereby, an electric motor connected to the switch, a circuit closer for starting the motor when the collector passes the insulated section of conductor, a crank shaft between the motor and switch, and means on said crank shaft for automatically stopping the motor at the completion of the throw of the switch in either direction.

6. The combination of a railway switch, an operating electric motor, a shaft driven thereby, mechanism connecting said shaft and switch and adapted to throw the switch in one direction upon a half turn of the shaft, and in the opposite direction in the next half turn of the shaft in the same direction, means for closing a circuit of said motor at will, as a vehicle approaches the switch, and means operated by the motor for automatically stopping it when the switch has been thrown.

7. The combination of a railway switch, an operating electric motor therefor, a circuit closer acting momentarily as the vehicle approaches the switch, means governed by said circuit closer for starting the motor, means whereby the motor may continue in operation after the circuit closer has passed out of action, and means for automatically interrupting the circuit of the motor when the same has moved sufficiently to complete the throw of the switch.

8. The combination with a railway switch, of an operating electric motor, mechanism driven by the motor for reciprocating the switch, a rotary circuit closer and breaker driven by the motor and adapted to interrupt a motor circuit at the completion of the throw of the switch in either direction, and means for starting the motor independently of said circuit closer and breaker.

Signed at New York in the county of New York and State of New York this 11th day of June A. D. 1907.

MERLE J. WIGHTMAN.

Witnesses:
C. F. TISCHNER, Jr.
LILLIAN BLOND.